US007572078B2

(12) United States Patent
Siebert

(10) Patent No.: US 7,572,078 B2

(45) Date of Patent: Aug. 11, 2009

(54) ELECTRONIC KEY DEPTH SENSING DEVICE AND METHOD FOR INTERPRETING KEYSTROKE LEVELS OF THE DEVICE

(75) Inventor: David Siebert, Port St. Lucie, FL (US)

(73) Assignee: Advantage Technology & Innovations, Inc., Stuart, FL (US)

( * ) Notice: Subject to any disclaimer, the term of this patent is extended or adjusted under 35 U.S.C. 154(b) by 0 days.

(21) Appl. No.: 11/077,786

(22) Filed: Mar. 11, 2005

(65) Prior Publication Data

US 2005/0201807 A1 Sep. 15, 2005

Related U.S. Application Data

(60) Provisional application No. 60/552,569, filed on Mar. 12, 2004.

(51) Int. Cl.
*B41J 3/26* (2006.01)
*B41J 29/38* (2006.01)
*G06F 3/023* (2006.01)

(52) U.S. Cl. ........................... 400/94; 400/91; 400/472

(58) Field of Classification Search ................. 400/477, 400/479, 479.1, 479.2, 480, 481, 482, 490, 400/495; 704/235
See application file for complete search history.

(56) References Cited

U.S. PATENT DOCUMENTS 3,056,030 A 9/1962 Kelchner
3,495,239 A 2/1970 Glorioso et al.
3,579,047 A 5/1971 Sturm et al.
3,588,512 A 6/1971 Hollien
3,856,127 A 12/1974 Halfon et al.
3,886,544 A 5/1975 Narodny
4,013,342 A 3/1977 Narodny
4,292,517 A 9/1981 Nelson
4,311,990 A 1/1982 Burke
4,417,824 A 11/1983 Paterson et al.
4,860,008 A 8/1989 Battarel
5,434,566 A * 7/1995 Iwasa et al. ................... 341/34
5,605,406 A 2/1997 Bowen
5,949,952 A * 9/1999 Bennett et al. ................ 386/46
6,023,675 A * 2/2000 Bennett et al. ............. 704/235
6,204,839 B1 * 3/2001 Mato, Jr. ..................... 345/168
6,255,643 B1 7/2001 Sayag
6,313,762 B1 * 11/2001 Crowley et al. ............... 341/22
6,320,177 B1 11/2001 Sayag
6,497,521 B1 * 12/2002 Lohr .......................... 400/491

(Continued)

*Primary Examiner*—Daniel J Colilla
(74) *Attorney, Agent, or Firm*—Mayback & Hoffman, P.A.; Gregory L. Mayback; Scott D. Smiley

(57) ABSTRACT

A method for recording shadow keystrokes in an electronic stenographic recording machine having keys forming stenographic keystrokes when actuated includes the steps of sensing an extent of an actuation of a subset of the keys as a stenographic keystroke, recording values selected from the group consisting of a full value and at least one intermediate value corresponding to the extent of the actuation of each of the subset of keys, and determining a first subset of possible translations of the stenographic keystroke based upon a second subset of possible combinations of the recorded values of the subset of the keys. Also, an extent of an actuation of at least one key can be sensed and at least one intermediate value corresponding to the extent of the actuation of the at least one key can be recorded.

15 Claims, 8 Drawing Sheets

U.S. PATENT DOCUMENTS 6,824,321 B2 * 11/2004 Ward et al. .................. 400/479
6,980,953 B1 * 12/2005 Kanevsky et al. ........... 704/235
7,048,456 B2 * 5/2006 Keinonen et al. ........... 400/495
2002/0049595 A1 * 4/2002 Bennett et al. .............. 704/260
2002/0101537 A1 * 8/2002 Basson et al. ............... 348/465
2005/0187766 A1 * 8/2005 Rennillo et al. ............. 704/235
2005/0187774 A1 * 8/2005 Vuong ........................ 704/277

* cited by examiner

ELECTRONIC KEY DEPTH SENSING DEVICE AND METHOD FOR INTERPRETING KEYSTROKE LEVELS OF THE DEVICE

CROSS-REFERENCE TO RELATED APPLICATION

This application claims the benefit under 35 U.S.C. §119 (e) of U.S. Provisional Application No. 60/552,569, filed Mar. 12, 2004, the complete disclosure of which is hereby incorporated by reference herein in its entirety.

BACKGROUND OF THE INVENTION

Field of the Invention

The invention lies in the field of keystroke devices. In particular, the invention is in the field of computer or stenographic keyboards and methods and software for interpreting keystrokes of these keyboards.

Various keystroke devices exist in the art. The most prevalent keystroke device is a computer keyboard. The keys of a standard computer keyboard are merely switches electronically indicating only a depressed state. Therefore, no signal is output or indicated by the keyboard when a keyboard is at rest, and a signal corresponding to depressed key(s) is output or indicated only when at least one key is depressed sufficiently far to "set off" the switch of that key or the switches of that set of keys.

A typewriter also has a keyboard, which can be mechanical and/or electronic. Like the computer keyboard, actuation (e.g., depression) of a key is intended to print a character. In electronic typewriters, when a key is actuated sufficiently far, a signal is sent to a processor to have the corresponding key(s) printed on the typing medium (e.g., paper). Mechanical typewriters are similar to electronic typewriters, but with one significant difference. Mechanical typewriters connect the key of the keyboard directly to the hammer containing the corresponding character to be printed on the page. Such a connection typically places the key at the end of a lever connected to a fulcrum and, when the lever is depressed at a proximal end, the distal end of the lever forcibly contacts or causes a hammer to pivot its distal end towards the page. A printing ribbon is disposed between the page and the end of travel of the hammer and a character formed at the end of the hammer is printed on the paper because the raised character presses the printing ribbon against the page. Because such an assembly is a mechanical connection dependent upon the pressure imparted by the user, the hammer can hit the page with varying degrees of force. A relatively hard contact produces a clearly printed character on the page. In contrast, a relatively soft contact may produce a lightly printed character, which also can be referred to as a "shadow." For mechanical typewriters, it is more desirable to have clearly printed characters than to have shadow characters. Therefore, improvements were made over the history of mechanical typewriters to guarantee relatively uniform contact between the hammer and the page, which improvements were, thereafter, incorporated into most electronic typewriters.

Another keystroke device can be found on stenographic devices. The most modern stenographic devices are entirely electronic and virtually immediately translate the stenographic key actuations into an accurate written representation of the spoken word. These modern devices are analogous to the electronic typewriters and computer keyboards in that a specific actuation of a key or set of keys will cause a clear printing or storage of the corresponding character or set of characters. Insufficient depression of a key(s) will not generate any output. Alternatively, depression of a set of keys (which is common for stenographic dictation) where one or more keys is sufficiently actuated but one or more other key(s) is insufficiently actuated will generate an output that does not correspond to the stenographers' intended output. Thus, the stenographer or computer associated with the stenographic device might not be able to accurately translate the inadequately actuated key(s) depending upon what was actually output to the paper or the electronically stored file.

The earlier stenographic devices provided an advantage over the modern stenographic devices. The older devices gave a stenographer some ability to determine a correct output from an incorrect input because these older mechanical devices printed the output on the paper in varying degrees of lightness. Stenographers refer to a lightly printed output as "shadow" output. So, if an intended output was lightly printed on the stenographic paper, that stenographer might have been able to determine what was intended during the original dictation and correctly translate the spoken word in the final transcript. Modern stenographic devices, however, are not able to electronically understand or store shadow output. If the stenographer does not actuate a key adequately, then no output is generated. And, if keys or a set of keys are actuated in varying degrees, then incorrect output is transcribed.

SUMMARY OF THE INVENTION

It is accordingly an object of the invention to provide an electronic key depth sensing device and a method for interpreting keystroke levels of a key device that overcomes the hereinafore-mentioned disadvantages of the heretofore-known devices and methods of this general type and that has a plurality of actuation levels in excess of merely on and off and that allows modern keystroke devices, in particular, stenographic devices, to register and interpret shadows, and methods and software for interpreting an actuation level of a multi-actuation level keystroke device.

Prior art keystroke sensing devices simply sense whether a key has been pressed or not. The device according to the invention, in contrast, senses how far a key has been pressed and displays, produces, and/or communicates intermediate values corresponding to the extent of key actuation. The output can be tertiary, in that the key is (1) not actuated, (2) partially actuated, or (3) fully actuated. Alternatively, the output can have any number of degrees, ten for example.

The keystroke device is used particularly with a stenograph machine (e.g., for court reporters) and emulates, in a modern digital stenograph machine, a sensitivity adjustment previously existing only in paper stenograph machines. In paper stenograph machines, when a court reporter lightly touched a key(s), then the paper would be printed, not with a clear print of the keystroke, but with a light or shadow keystroke. As used herein, the words "keystroke" or a "stenographic keystroke" include any possible actuation of a key device or set of key devices. In other words, the definition includes both recognized key actuations (whether for a single key or a set of more than one key) and any unrecognized, accidental, incorrect, and/or inadvertent actuation of a single key or a set of more than one key.

If the court reporter desired, the sensitivity of the paper machine could be adjusted for that court reporter's particular style of keystroke actuation using a sensitivity adjustment device. Such adjustment is considered advantageous for various reasons. First, court reporters use their fingers for hours at a time. Adjustment of keys towards the most comfortable return bias is, therefore, desirable. Second, different stenographers stroke the keys in unique ways. Allowing detection of shadows can correct one person's bad keystroke habits.

Now, digital machines are replacing paper machines. However, for digital machines, if a reporter actuates a key(s) lightly, then no stroke is registered at all. It is, therefore, desirable to emulate the paper machine functionality by registering lighter keystrokes on the computer, preferably, with a visibly shadowed or visibly lighter indication on the stenograph's digital display.

With the foregoing and other objects in view, there is provided, in accordance with the invention, a method for recording shadow keystrokes in an electronic stenographic recording machine having keys forming stenographic keystrokes when actuated, including the steps of sensing an extent of an actuation of at least one key and recording at least one intermediate value corresponding to the extent of the actuation of the at least one key.

With the objects of the invention in view, there is also provided a method for recording shadow keystrokes in an electronic stenographic recording machine having keys, including the steps of sensing at least one of a partially actuated and a fully actuated key and recording the sensed actuation of the key.

With the objects of the invention in view, there is also provided a method for recording shadow keystrokes in an electronic stenographic recording machine having keys, sensing an actuation of a key selected from one of a group consisting of a set of partial actuations and a full actuation and recording the sensed actuation of the key.

With the objects of the invention in view, there is also provided a method for recording shadow keystrokes in an electronic stenographic recording machine having keys forming stenographic keystrokes when actuated, including the steps of sensing an extent of an actuation of a subset of the keys as a stenographic keystroke, recording values selected from the group consisting of a full value and at least one intermediate value corresponding to the extent of the actuation of each of the subset of keys, and determining a first subset of possible translations of the stenographic keystroke based upon a second subset of possible combinations of the recorded values of the subset of the keys.

In accordance with another mode of the invention, there is provided the step of recording the sensed key in a memory as at least a part of a stenographic keystroke.

In accordance with a further mode of the invention, the sensing and recording steps are carried out for each of the keys actuated in each stenographic keystroke and determining a first subset of possible translations of each stenographic keystroke based upon a second subset of possible combinations of sensed intermediate values of at least one of the actuated keys.

In accordance with an added mode of the invention, the electronic recording machine is a digital stenograph machine and the actuation is at least a partial stroke of one of the keys.

In accordance with an additional mode of the invention, there is provided the step of placing an optical sensor at the key for sensing the extent of the actuation of the at least one key and carrying out the sensing step with the optical sensor.

In accordance with yet another mode of the invention, there is provided the step of translating the stenographic keystroke based upon the actuation of at least one of the keys and storing each translated stenographic keystroke in the memory.

In accordance with yet an added mode of the invention, there is provided the steps of associating a combination of each set of keys actuated as an untranslated stenographic data, transmitting the untranslated stenographic data to an external translating computer, and translating the untranslated stenographic data with the external translating computer.

In accordance with yet an additional mode of the invention, there is provided the step of receiving the translated stenographic data from the external translating computer.

In accordance with again another mode of the invention, there is provided the step of displaying the translated stenographic data to a user.

In accordance with again a further mode of the invention, the transmitting and receiving steps are carried out over the Internet.

In accordance with again an added mode of the invention, there is provided the steps of storing information including at least one of digital video images and audio data while the at least one key is being sensed and temporally associating the stored information with each key that is sensed.

In accordance with again an additional mode of the invention, there is provided the step of associating a portion of said stored information with at least one stenographic stroke.

In accordance with still another mode of the invention, the sensing step is carried out by sensing the extent of the actuation of each key of a subset of keys and recording at least one intermediate value corresponding to the extent of each actuation of the subset of keys.

In accordance with still a further mode of the invention, the translating step is carried out by associating translated stenographic strokes to known stenographic keystrokes with a set of closest-match comparisons.

In accordance with a concomitant mode of the invention, the set of partial actuations includes nine partial actuation levels.

The device according to the invention electronically senses an actuation depth of an individual key. A sensor is disposed to sense the actuation depth. In particular, an optical sensor is disposed near a cam and detects a light source emanating towards the optical sensor from another side of the cam. As the cam moves out of the light path or into the light path, such a sensor detects a strong or weak signal. The strong signal can mean that a standard character (not shadowed) is output and a weak signal can translate into a display of a shadowed character, or vice-versa depending upon the desired receiver configuration.

The device according to the invention can also include an integrated data processing system that translates, in almost real-time, the stenographic keystrokes into understandable English and stores both data in a memory (e.g., RAM, ROM, removable media) locally or wirelessly to an external location. The device can include a transceiver utilizing a bi-directional data channel to transmit untranslated stenographic data to a translating computer in real time. The translating computer can, then, translate the stenographic data and transmit a translated data stream back to the device, or to any combination of other devices that can be connected (directly or wirelessly) to the translating computer, for almost real time use and/or analysis by the stenographer. One example of such a system provides the stenographic device with a connection (direct or wireless) to the Internet and the translating computer with a connection (direct or wireless) to the Internet. Thus, commonly available Internet connection devices available at the location where the stenographer is taking data can be used to facilitate quick and inexpensive translation of stenographic data.

The device according to the invention can also include a multimedia recorder that can store, in a memory, digital video images and audio data. By recording the audio and/or video of the subject(s) of the stenographer on the device, it becomes possible to associate a portion of the multi-media file with a stenographic stroke. Such recording and coordination of stenographic and video and/or audio data allows the stenographer to playback images of and/or sounds from the subject to assist in the accurate translation of the stenographic keystrokes.

Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications method to assist the stenographer in accurate translation of the stenographic data.

Other features that are considered as characteristic for the invention are set forth in the appended claims.

Although the invention is illustrated and described herein as embodied in an electronic key depth sensing device and a method for interpreting actuation levels of a key device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
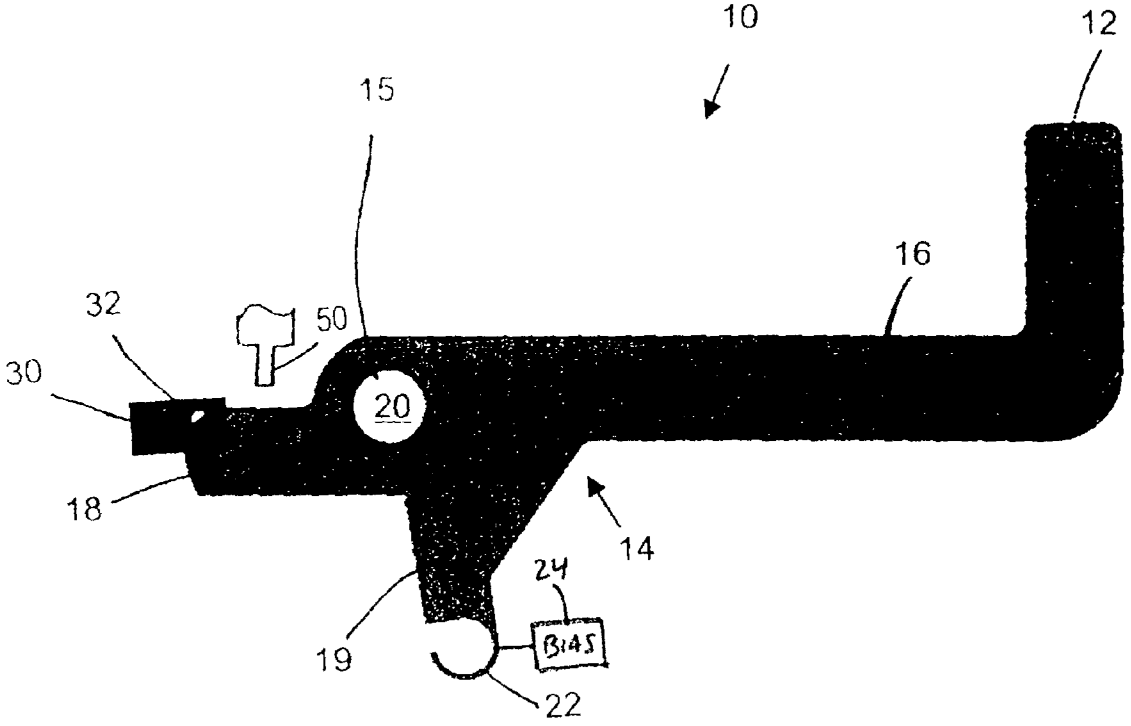
FIG. 1 is a fragmentary, side elevational view of one embodiment of a keystroke device according to the invention.
Figure 2:
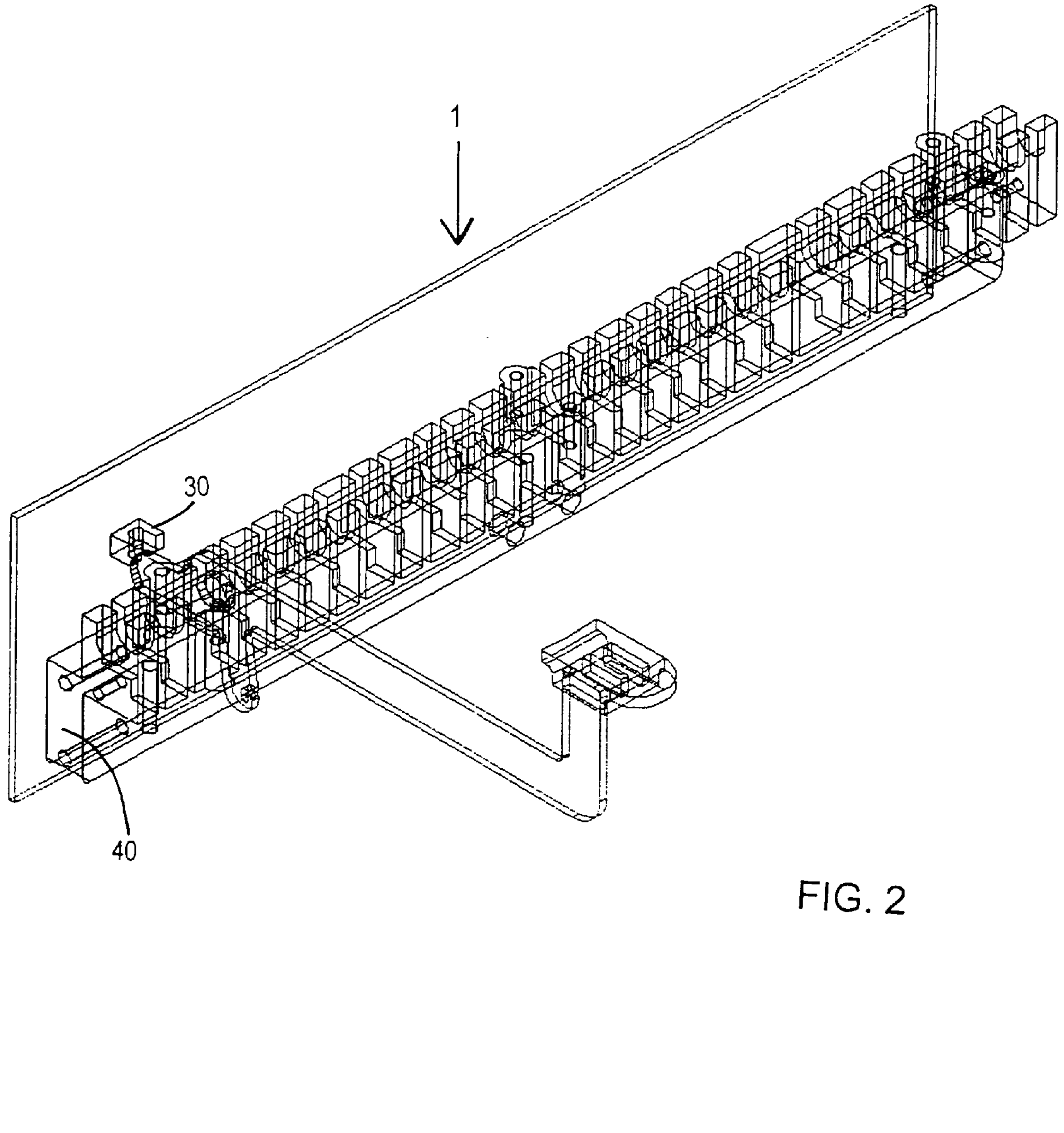
FIG. 2 is a wire-frame perspective view of a machine having a key-retaining device for receiving a plurality of the keystroke device of FIG. 1.
Figure 3:
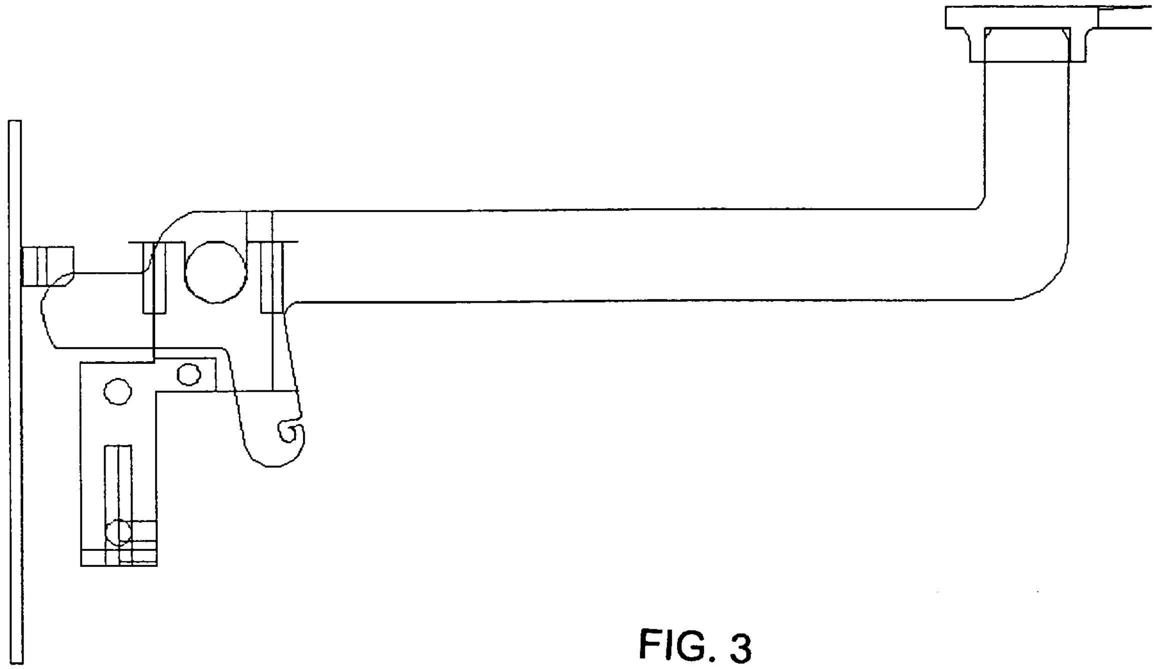
FIG. 3 is a wire-frame side elevational view of the machine, the key-retaining device, and the keystroke device of FIG. 2.
Figure 4:
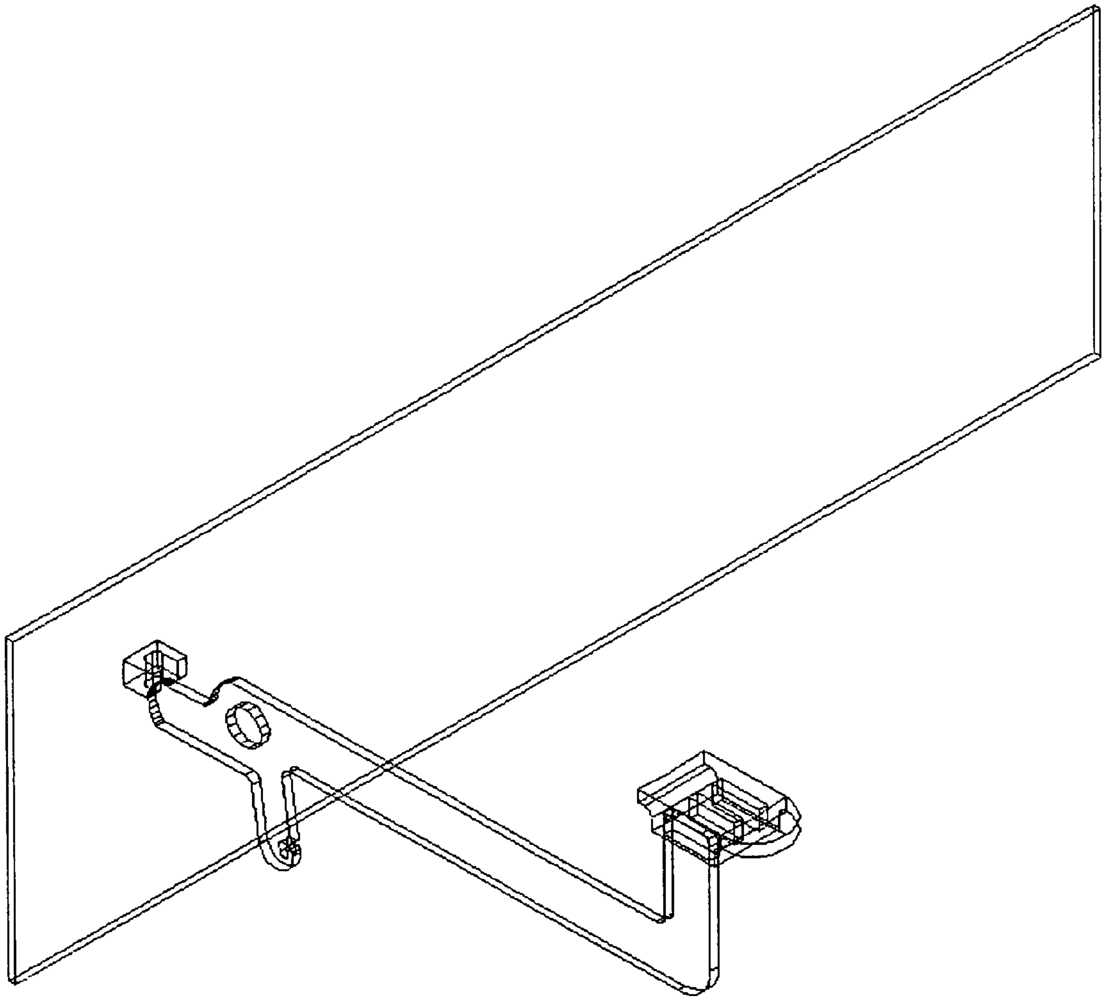
FIG. 4 is a wire-frame perspective view of the machine and the keystroke device of FIG. 2 without the key-retaining device.
Figure 5:
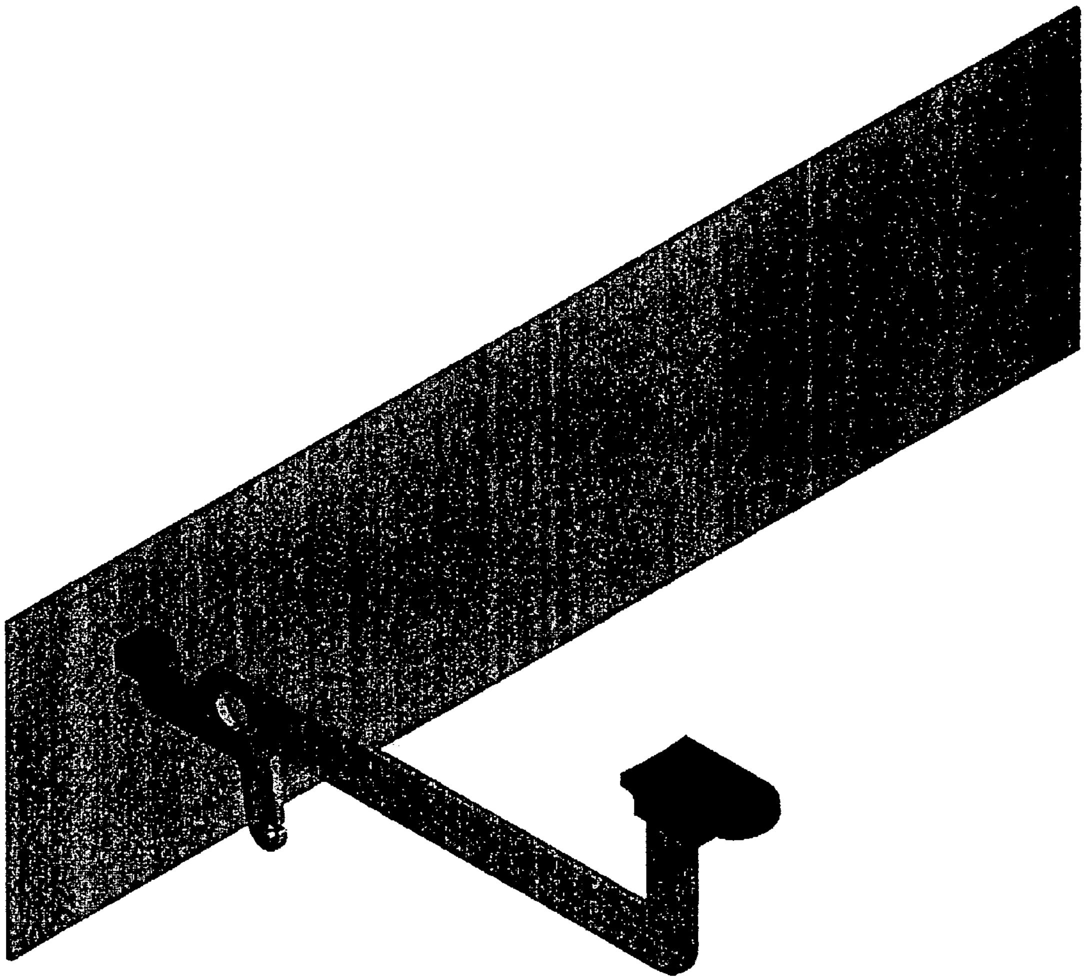
FIG. 5 is a perspective view of the machine and the keystroke device of FIG. 2 without the key-retaining device.

Referring now to the figures of the drawings in detail and first, particularly to FIG. 1 thereof, there is shown a single keystroke device 10 to be used in a keyboard of some kind. The keystroke device 10 has a contact area 12 at which a user imparts the force for activating the keystroke device 1. The contact area 12 is connected to a proximal portion 16 of a key lever 14. The key lever 14 is connected movably to a key-retaining device 40 (see FIG. 2) at a pivot point 20. The key lever 14 defines a pivot area 15 disposed between a distal portion 18 of the key lever 14 and the proximal portion 16 of the key lever 14. The key lever 14 has a bias extension 19 (also referred to as a cam lever) for receiving a force that will be imparted upon the key lever 14 to keep the contact area 12 raised, i.e., in a non-actuated position.

In the embodiment shown in FIGS. 1 to 5, the bias extension 19 has, at a distal end thereof, a hook 22 to be inserted through an end ring of a bias device 24, e.g., a spring, illustrated only diagrammatically in FIG. 1. To impart a raising force to the key lever 14, the spring is oriented so that the force imparted on the bias extension 19 rotates the proximal portion 16 counter-clockwise with respect to FIGS. 1 to 5 about the pivot point 20. The bias extension 19 and hook 22 shown in FIGS. 1 to 5 is only an exemplary embodiment for keeping the keystroke device 1 in a non-actuated position. The configuration of the bias extension 19 can take any form and the direction of force imparted by biasing spring can be in any direction so long as the contact area 12 is raised when not activated and biases the key to the raised position after being actuated. (The described configuration, of course, assumes that the keystroke device 10 is to be actuated by a lowering movement. Force in the opposite direction applies if the keystroke device 10 is to be lifted by a user.)

To communicate an actuation of the contact area 12 by a user to electronics of machine 1 in which the keystroke device 10 resides, the machine 1 has a switch or contact 50. The contact 50 can take any form so long as a given actuation of the contact area 12 imparts a sufficient force to the contact 50 to indicate that a user wants the corresponding function of the keystroke device 10 to be activated (e.g., to print a character on a page and/or to store a character in an electronic file). The contact 50 can be merely a conducting contact surface that completes an electrical circuit when the keystroke device 1 is fully actuated or it can be a piston or lever that is depressed to actuate a switch physically when the keystroke device 1 is fully actuated. Therefore, it is not necessary to illustrate the contact 50 other than diagrammatically.

To sense a depression depth of the contact area 12, a sensor 30 is disposed somewhere at the lever 14 such that the sensor 30 can detect how far the contact area 12 has been depressed. The sensor 30 can be disposed anywhere with regard to any portion (16, 18, 19) of the lever so long as it can detect movement of the lever 14. In a preferred embodiment, however, the sensor 30 is disposed adjacent the distal portion 18 and on a side of the pivot point 20 opposite the proximal portion 16. In this preferred embodiment, to keep movement of the segment of the distal portion 18 with respect to the sensor 30 linear, the measuring surface of the distal portion 18 (top surface in FIG. 1) has a longitudinal extent that passes directly through the center of the pivot point 20. It is noted that if the sensor 30 can detect all of the desired number of movement "levels" from non-depression of the lever 14 to full depression of the lever 14, then the contact 50 is rendered unnecessary.

For purposes of illustration, the sensor 30 in FIG. 1 has a circular cutout 32. Therefore, in the view of FIG. 1, the distal portion 18 can be seen through the cutout "window." The position of the lever 14 in FIG. 1 is shown blocking approximately half of the window. Accordingly, if a light were placed on one side of the distal portion 18 and a light-detector was placed on the other side of the distal portion 18, then the amount of light received by the detector would be approximately half of the amount received when the distal portion 18 was not blocking any part of the window.

Figure 6:
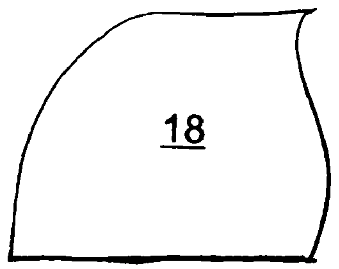
FIG. 6 is a fragmentary side elevational view of a first embodiment of a distal end of a distal portion of the keystroke device of FIG. 1.
Figure 7:
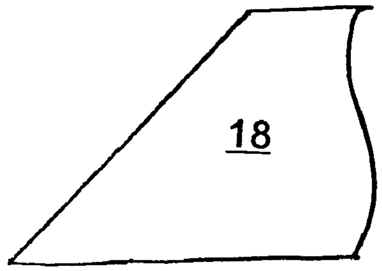
FIG. 7 is a fragmentary side elevational view of a second embodiment of the distal end of the distal portion of the keystroke device of FIG. 1.
Figure 8:
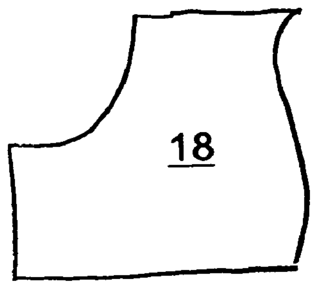
FIG. 8 is a fragmentary side elevational view of a third embodiment of the distal end of the distal portion of the keystroke device of FIG. 1.

The sensor 30 can detect movement of the distal portion 18 in any number of ways. In the preferred embodiment shown in FIG. 1, the distal portion 18 blocks a non-illustrated light source of the sensor to vary an amount of light, the variance being proportional to a displacement of the contact area 12 by a user. Blocking of the light source is dependent upon the shape of distal portion 18. FIGS. 6, 7, and 8 illustrate three exemplary embodiments for the distal end (furthest from the pivot point 20) of the distal portion 18. When the distal portion 18 is curved as diagrammatically illustrated in FIG. 6, the light source is blocked in a linear manner. In comparison, when the distal portion 18 is linear, as shown in FIG. 7, the light source is blocked in an exponential manner. Finally, when the distal portion 18 is curved as shown in FIG. 8, the light source is blocked in a non-linear manner.

The embodiment in FIG. 1 has a distal portion 18 with the shape corresponding to FIG. 6. Thus, the light detected by the sensor 30 will be directly proportional to the travel of the proximal portion 16. From the detected light, the sensor 30 (or the detector of the sensor 30) can output a signal (e.g., a voltage level) dependent upon the movement of the distal portion 18. Such a signal can be processed to allow the machine 1 to not only register a keystroke, but also to register a partial-keystroke, i.e., a shadow. If an evenly and equally separate number of shadow levels are desired, then a linear output is preferred.

It is noted that the sensor 30 need not be placed at the distal portion 18 as illustrated in FIGS. 1 to 5. Instead, the sensor 30 can be positioned at the proximal portion 16. For example, if the sensor 30 is disposed above the proximal portion 16 as viewed in FIG. 1, then a rest position of the lever 14 places the proximal portion 16 to completely cover the window 32 of the sensor 30, and depression of the lever 14 moves the proximal portion 16 away from the window 32 to uncover the light source and allow light to be detected in an increasing manner the further the lever 14 is depressed.

In an embodiment of the sensor 30 where an analog voltage is output, a depth of the keystroke is registered by a change in the value of the analog voltage, which voltage is controlled by the distal portion 18, attached to or integral with the key arm, selectively interrupting the optical receiver. When such an analog signal is provided, the sensor 30 can be connected to a downstream analog-to-digital converter for later digital interpretation of the level of the light received.

Other possible options for detecting a position of the lever 14 exist. For example, the depth of a keystroke can be registered with a digital decoder directly connected to the lever 14. Such a decoder outputs a direct digital value dependent upon depth of the keystroke. Because the decoder is digital, the internal algorithm can, through appropriate software, make the output digital value change in any desired manner—linearly, exponentially, or otherwise—dependent upon the recorded depth of the keystroke.

Also, processing can include an algorithm that allows the user to selectively change/adjust the range and/or the number of levels of the output signal. An input device can be provided to give the stenographer a user-customized interpretation of a full key actuation, a partial key actuation, and/or any number of levels between no actuation and full actuation. The customizing input can be provided through appropriate manipulation of a physical item (a dial) or by executing a software program that controls the processing of the electrical input signal corresponding to the key actuation depth.

Alternatively, instead of generating more than two levels of a keystroke as set forth above, the sensor 30 can merely output two levels. In a first embodiment, the sensor 30 can output two levels corresponding to a partial key actuation (a shadow) and a full key actuation. In this configuration, a switch 50 is unnecessary. In a second embodiment, the sensor 30 can be, for example, a three-part system with two switches 50: a first of the switches registering a partial key actuation; and a second of the switches registering a complete key actuation, or, the switch 50 can be a single two-level switch.

The sensor can also have the capability of using an optical encoding wheel to measure the key throw. For example, an encoder can be used to produce a pulse when the wheel (operatively connected to the lever 14) moves a given distance. Also, a focused light beam can be used to count rotations of the encoder wheel.

Varying degrees of movement of the lever 14 can also be detected using a resistive device, e.g., a resistor network or a potentiometer, with the depth of the keystroke being dependent upon a resistance presented by the device to a resistance measuring circuit. An accelerometer can also be used to detect the depth of the keystroke.

The above embodiments relate to the mechanics of the keystroke device 10 according to the invention. Once the sensor 30 generates the electrical output signal, this signal can be supplied to a processor μP for evaluation.

Emulation of the appearance of a printed stenograph output with a paperless electronic stenotype machine having an electronic display (e.g., LED, LCD, Flat Panel) can occur by electrically supplying depth information for each key pressed by the user in addition to the electronic data corresponding to the particular stenographic stroke, also sometimes referred to herein as a "word". When a stroke is registered but is within a specified range less than a full depth of the stroke, the stroke can be stored electronically as a shadow. If, for example, ten values of shadow can be detected (or are programmed to be detectable), those values can be assigned to a specific level of brightness (e.g., in a look-up table or programmed in an EEPROM or stored in a flash RAM, hard drive, or static RAM) or, instead of a look up table, an equation can be used to shift the depth value byte four bits to get an intensity scale. Thus, the shadow will display on the output screen as characters lighter than a non-shadowed character. Instead of using merely brightness of the character(s) as the visible indicator, the shadow can also be varied using a difference in color, font, or other display attribute, or even by a combination of different display attributes.

Figure 9:
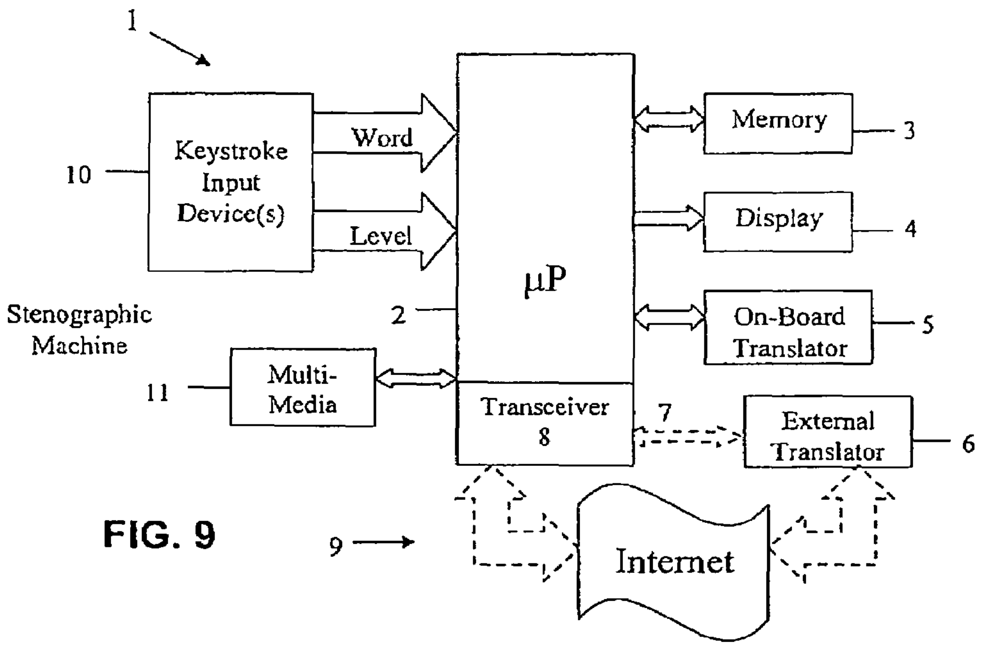
FIG. 9 is a block circuit diagram of a stenographic system according to the invention.

FIG. 9 is a block circuit diagram of a stenographic device according to the invention. The stenographic machine 1 has a plurality of keystroke devices 10, which are connected to an on-board microprocessor 2. A memory 3 (e.g., RAM, ROM, hard drive, removable memory) is connected to the microprocessor 2 for storing data and supplying stored data to the microprocessor 2. A display 4 is connected to the microprocessor 2 for displaying stenographic and/or translated data and for displaying the shadows determined/detected by the microprocessor 2. The microprocessor 2 controls all electronic operations including receiving stenographic data and shadow data, storing all data, and displaying all desired processes, which processes can include the stenographic and/or level data itself, indications that data is being stored, indications that data is being translated, translated stenographic output, and many others.

Depending upon the configuration of the stenographic device, a translator 5 can be on-board the device and, therefore, it is directly connected to the microprocessor 2 for translating stored or incoming (real-time) stenographic data. Thus, input electronics for the keystroke device can be directly connected to the same processor 2 that controls the translation program, and the functions of input, shadow determination, translation, and correction/editing can be performed on a single unit 1.

If the translator is not on board the stenographer's device 1, then the device 1 can be connected to an external stenographic translator 6, in which case the translator 6 is separate from the stenographic device 1 and information stored in the memory 3 is relayed 7 either by transfer through an intermediate media (e.g., floppy disk, micro-drive), in which case the device will have a floppy drive, USB port, Firewire port, etc., or wirelessly through some kind of communication data link (e.g., a Bluetooth, ISDN, Internet, or other wireless data link), in which case the device will have an on-board transceiver 8.

In either case, the translator 5, 6 translates the stenographic data to the respective language (e.g., English). When the device 1 is associated directly with a translation system, translation occurs quickly so that the stenographer can view his/her stenographic keystrokes in almost real-time and in relatively understandable English (dependent upon the quality of the word/translation processor). The memory 3 will store the translation locally 3, 11 and/or externally 7, 9.

FIG. 9 further illustrates the stenographic device 1 and an embodiment 9 for connecting the device to an external stenographic translator 6. In the example of FIG. 9, the translator 6 is connected to the Internet and is housed at a location different from the stenographer's location. In such a networked configuration, the transceiver 8 can utilize a bi-directional data channel to transmit the un-translated stenographic data to the external translating computer 6 (represented by the dashed arrows), whether in real time or delayed. The translating computer 6 can, then, translate the stenographic data and transmit a translated data stream back to the device immediately or at a later time and to any other device that can be connected (directly or wirelessly) to the translating computer (also represented by the dashed arrows). Thus, the stenographer can have almost real-time analysis even without having an on-board translator.

One example of such a system 9 provides the stenographic device 1 with a connection (e.g., a direct or wireless transceiver 8) to the Internet and the external translating computer 6 with a connection (direct or wireless) also to the Internet. Thus, commonly available Internet connection devices available at the location where the stenographer is taking data can be used to facilitate quick and inexpensive translation of stenographic data without having to store the translation software on the stenographer's machine 1.

When the device 1 has an integrated word processing system, then the functions of dictation, translation, and editing of the translation can be performed by the stenographer on a single machine.

The device 1 can also include a multi-media recorder 11 that can store, in a memory 3, digital video images and/or audio data. By recording the audio and/or video of the subject (s) of the stenographer on the device, it becomes possible to associate a portion of the multi-media file with a stenographic stroke. Such recording and coordination of stenographic and video and/or audio data allows the stenographer to playback images of and/or sounds from the subject to assist in the accurate translation of the stenographic keystrokes. Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications measures to assist the stenographer in accurate translation of the stenographic data.

If a stroke registered by the device is not in the user's stenographic dictionary, an internal algorithm of the translator 5, 6 can be activated to add and/or remove shadowed keys from the stroke until a stenographic match is found for the particular key(s) activation, somewhat like a closest-match routine known in the art of spell-checking devices. Thus, where a partial key actuation (shadow) occurs and the keystroke is not translatable, the shadowed keystroke can be combined with other similar stenographic keystrokes and, along with a spelling and grammar checking device, and can be corrected to fix a mis-stroke or can provide the stenographer with a list of various possible translations for that misstroke, which list would be examined by the stenographer at a later time, i.e., when the stenographic dictation breaks or at another location entirely.

Figure 10:
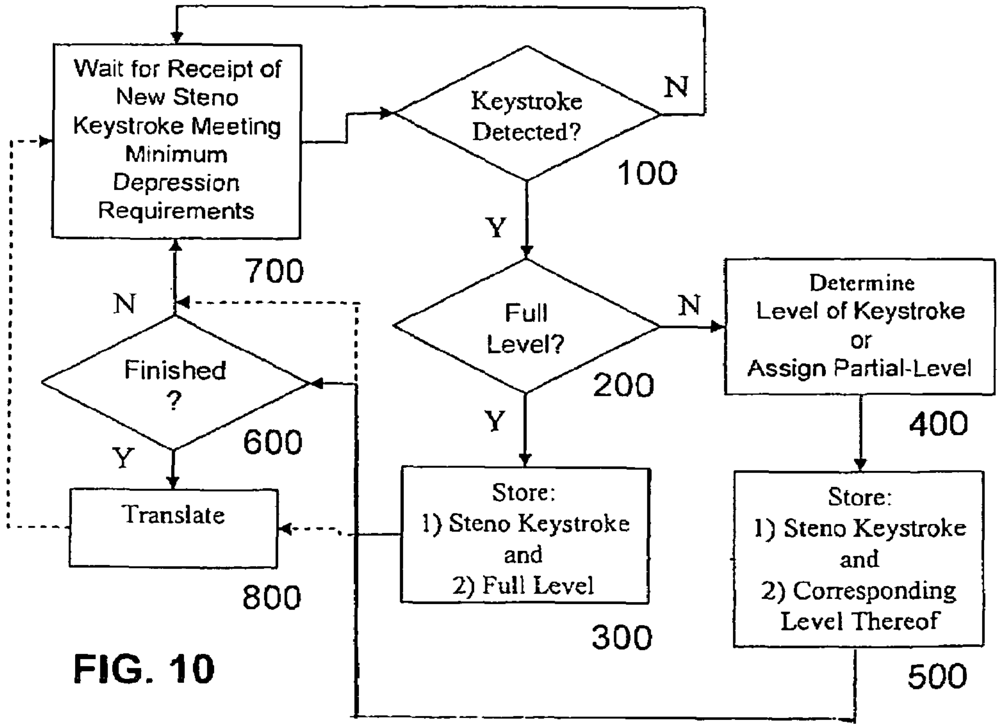
FIG. 10 is a flow chart illustrating a first embodiment of the method for assigning shadows according to the invention.

A first exemplary method for interpreting a depth of the keystroke is illustrated with respect to the flowchart of FIG. 10. In Step 100, a query is performed to determine if a stroke has been detected. If a stroke has been detected, then, in Step 200, the level of the stroke is determined, in other words, whether or not the stroke is a shadow stroke. If the level is determined to be full (complete actuation of the keystroke), then, the corresponding stenographic stroke with or without a full-level indicator is/are stored/transcribed in Step 300. If the level of the stroke is determined to be partial, then two possibilities occur. If the system is only configured to register a full stroke or a partial-stroke, then, in Step 400, the just-received stenographic stroke is indicated as being a partial-level (shadow), and the corresponding stenographic keystroke and a shadow indicator are stored/transcribed in Step 500. If, however, the system is configured to detect more than just one partial-level, the corresponding actuation level is detected and the appropriate shadow is determined along with the detection of the just-received stenographic stroke in Step 400. In such a case, the corresponding stenographic stroke and shadow level are stored/transcribed in Step 500.

A query is made in step 600 to determine if stroke entry is finished (which, for example, may be indicated by a separate input from the stenographer). If the answer is no (e.g., the default situation), then, the device 1 waits in Step 700 for the receipt of a new stroke (meeting a predefined minimum keystroke depth requirement).

Registering of a keystroke is detected in Step 100 by a change transmitted by a keystroke device sensor, e.g., in an analog voltage or by a digital position indicator. In a digital system, the depth of the keystroke is translated into a digital numeric value. The value can have more than three variations or can be a tertiary value, including on, off, and shadow. Subsequently, the value is translated into a visual indicator for the corresponding shadow or full value, the indicator including color, shade, font style, position, and/or size of the symbol that represents the actuated key or set of keys (these examples being only representative of possible visual display characteristics). If the stenographer is finished entering keystrokes (i.e., end of the job), then the keystrokes are translated in Step 800. It is noted that translation can be in real-time and, therefore, the circuit of Steps 100 to 700 can be repeated continuously and occur in parallel with translation. In such a configuration, Step 600 would be omitted and the dashed arrows in FIG. 10 would be performed instead.

Figure 11:
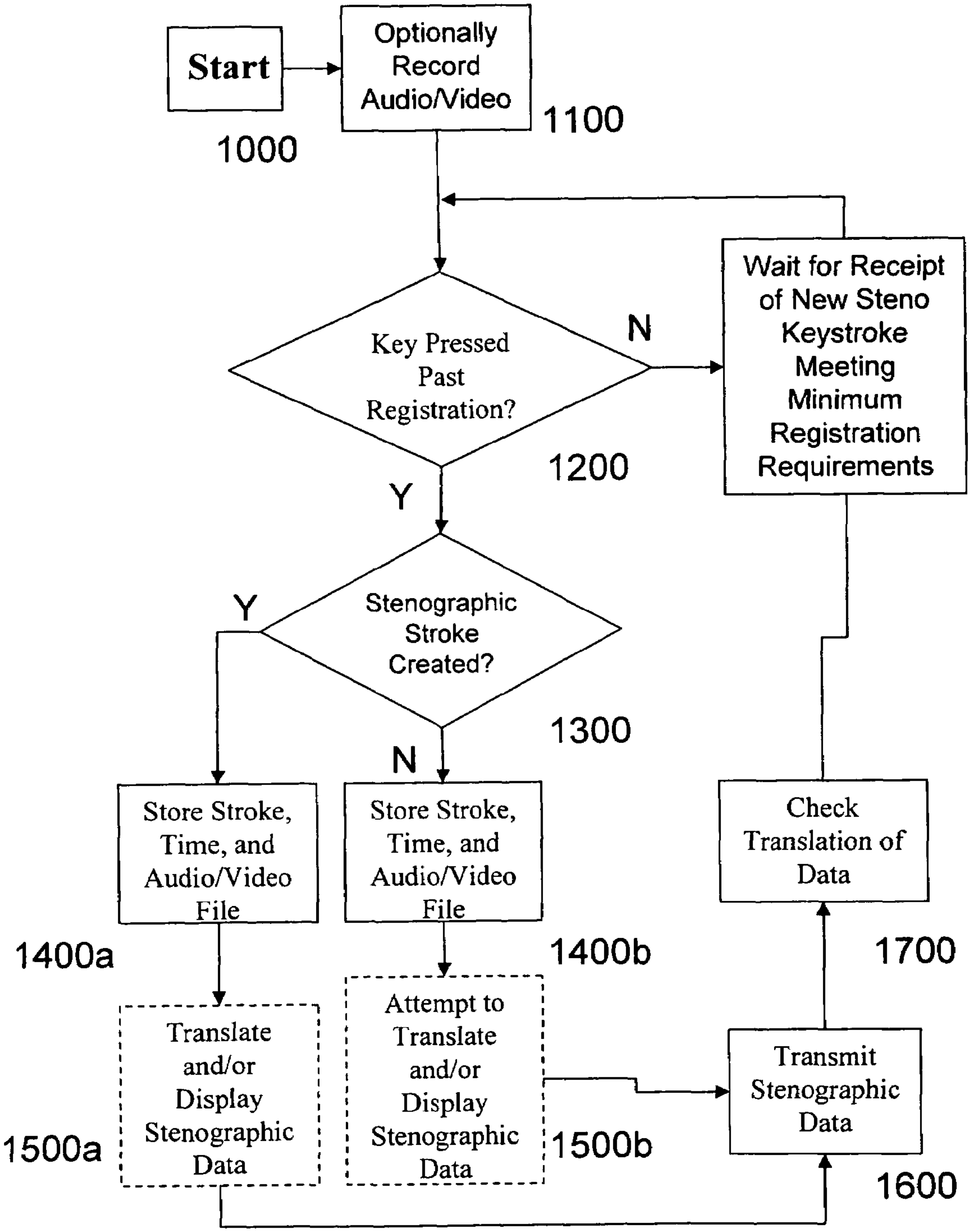
FIG. 11 is a flow chart illustrating a second embodiment of the method for assigning shadows according to the invention.

A second exemplary method for interpreting depth of the keystroke is illustrated with respect to the flowchart of FIG. 11. In Step 1000, the stenographic dictation begins. In Step 1100, audio and/or video of the proceedings to be stenographed are recorded electronically, which recording is an option to be selected by the stenographer. In Step 1200, a query is performed to determine if any key has been pressed past its registration point. If not, the system waits until this event occurs. In Step 1300, a query is performed to determine if all keys that are past the registration point create a recognizable stenographic stroke.

If the answer is yes, then, in Step 1400_a_, the time of the recognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. It is optional, in Step 1500_a_, to pass the stored stenographic stroke to an internal translator and/or to produce a text display.

If the answer is no and a recognizable stenographic stroke is not created, then an attempt to produce a recognizable stroke is performed based upon all of the keys that passed the registration point in combination with any partial key presses that did not reach registration point but were pressed in some way. Specifically, in Step 1400_b_, the time of the unrecognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. In Step 1500_b_, the unrecognizable stroke is passed to an internal translator to find a likely match or a set of possible matches. A text display can be made and/or a suitable signal (beep) can occur to notify the user that a potential error in transcription has occurred. The user can view the stroke, which will include any partial key presses identified by a different color, intensity of color, font, and/or size. If possible (because transcription is still occurring), the user can select the appropriate translation from the suggestions in real time.

In Step 1600, the stenographic data is transmitted to an external translator through some communications link, e.g., RS-232, USB, Network, Bluetooth, Firewire, WIFI, or any other data transmission measures. Optionally, in Step 1700, an external translator can check the translation data and relay that data through an available output device, such as an RS-232 port or network connection to an external display device such as a computer. This process is repeated until dictation is complete.

It is noted that the optional recording of audio and/or video data allows CIC and permits the user to track the stenographic data with the corresponding audio/video data and, thereby, correct any incorrect stenographic translation.

Other possible uses for the keystroke device 10 according to the invention include musical instruments. In one example, the volume of the note would increase or decrease based upon a level of the output signal. In another example, the volume of the note would increase dependent upon a rate of change of the signal (velocity).

I claim:

1. A method for recording shadow keystrokes in an electronic stenographic recording machine having keys forming stenographic keystrokes when actuated, which comprises:

sensing an extent of an actuation of at least one key within a multi-key stenographic keystroke on a stenographic keyboard; and recording in a memory at least one intermediate value corresponding to the extent of the actuation of the at least one key as at least a part of the multi-key stenographic keystroke.

2. The method according to claim 1, which further comprises:

carrying out the sensing and recording steps for each of the keys actuated in each stenographic keystroke; and determining a first subset of possible translations of each stenographic keystroke based upon a second subset of possible combinations of sensed intermediate values of at least one of the actuated keys.

3. The method according to claim 1, wherein the electronic recording machine is a digital stenograph machine and the actuation is at least a partial stroke of one of the keys.

4. The method according to claim 1, which further comprises:

placing an optical sensor at the key for sensing the extent of the actuation of the at least one key; and carrying out the sensing step with the optical sensor.

5. The method according to claim 1, which further comprises translating the stenographic keystroke based upon the actuation of at least one of the keys and storing each translated stenographic keystroke in the memory.

6. The method according to claim 1, which further comprises:

associating a combination of each set of keys actuated as an untranslated stenographic data;

transmitting the untranslated stenographic data to an external translating computer; and translating the untranslated stenographic data with the external translating computer.

7. The method according to claim 6, which further comprises receiving the translated stenographic data from the external translating computer.

8. The method according to claim 7, which further comprises displaying the translated stenographic data to a user.

9. The method according to claim 7, which further comprises carrying out the transmitting and receiving steps over the Internet.

10. The method according to claim 6, which further comprises carrying out the translating step by associating translated stenographic strokes to known stenographic keystrokes with a set of closest-match comparisons.

11. The method according to claim 1, which further comprises:

storing information including at least one of digital video images and audio data while the at least one key is being sensed; and temporally associating the stored information with each key that is sensed.

12. The method according to claim 11, which further comprises associating a portion of said stored information with at least one stenographic stroke.

13. The method according to claim 1, which further comprises carrying out the sensing step by sensing the extent of the actuation of each key of a subset of keys and recording at least one intermediate value corresponding to the extent of each actuation of the subset of keys.

14. A method for recording shadow keystrokes in an electronic stenographic recording machine having keys forming stenographic keystrokes when actuated, the method comprising:

sensing an extent of an actuation of at least one key as part of a stenographic keystroke on a stenographic keyboard;

recording in a memory at least one intermediate value corresponding to the extent of the actuation of the at least one key as at least a part of the stenographic keystroke;

associating a combination of each set of keys actuated as an untranslated stenographic data;

transmitting the untranslated stenographic data to an external translating computer; and translating the untranslated stenographic data with the external translating computer, wherein the untranslated stenographic data includes a set of partial actuations that includes nine partial actuation levels.

15. A method for recording shadow keystrokes in an electronic stenographic recording machine having keys forming stenographic keystrokes when actuated, which comprises:

sensing an extent of an actuation of a subset of keys within a multi-key stenographic keystroke on a stenographic keyboard as a stenographic keystroke;

recording in a memory at least one intermediate value corresponding to the extent of the actuation of each of the subset of keys within the multi-key stenographic keystroke as at least a part of a stenographic keystroke; and determining a first subset of possible translations of the stenographic keystroke based upon a second subset of possible combinations of the recorded values of the subset of the keys.

* * * * *